(12) United States Patent
Fischmann

(10) Patent No.: US 12,163,354 B2
(45) Date of Patent: Dec. 10, 2024

(54) URBAN TRANSFORMATION AND CONSTRUCTION METHOD FOR CREATING A PUBLIC ACCESS TROPICAL STYLE SWIMMING LAGOON WITH BEACHES WITHIN VACANT OR ABANDONED SITES

(71) Applicant: CRYSTAL LAGOONS TECHNOLOGIES, Inc., Coral Gables, FL (US)

(72) Inventor: Fernando Benjamin Fischmann, Coral Gables, FL (US)

(73) Assignee: CRYSTAL LAGOONS TECHNOLOGIES, INC., Coral Gables, FL (US)

( * ) Notice: Subject to any disclaimer, the term of this patent is extended or adjusted under 35 U.S.C. 154(b) by 327 days.

(21) Appl. No.: 17/871,823

(22) Filed: Jul. 22, 2022

(65) Prior Publication Data
US 2023/0047399 A1    Feb. 16, 2023

Related U.S. Application Data

(63) Continuation-in-part of application No. 17/360,328, filed on Jun. 28, 2021, now Pat. No. 11,732,493,
(Continued)

(51) Int. Cl.
*E04H 4/00*       (2006.01)
*E02D 17/00*   (2006.01)
(Continued)

(52) U.S. Cl.
CPC .............. *E04H 4/00* (2013.01); *E02D 17/00* (2013.01); *E04H 3/02* (2013.01); *E04H 3/12* (2013.01);
(Continued)

(58) Field of Classification Search
CPC .... E04H 4/00; E04H 3/02; E04H 3/22; E04H 2004/146; G06Q 20/045; G06Q 50/165; E02D 17/00
See application file for complete search history.

(56) References Cited

U.S. PATENT DOCUMENTS

| | | | |
|---|---|---|---|
| 483,600 | A | 10/1892 | Butler |
| 1,657,598 | A | 1/1928 | Whitman |

(Continued)

FOREIGN PATENT DOCUMENTS

| | | | |
|---|---|---|---|
| CN | 1214402 A | 4/1999 | |
| CN | 1367300 A | 9/2002 | |

(Continued)

OTHER PUBLICATIONS

Baskas, Harriet, Surfs Up at Munich Airport, <https://stuckattheairport.com/2014/07/12/surfs-up-at-munich-airport-2/> (2014).
(Continued)

*Primary Examiner* — Brent W Herring
(74) *Attorney, Agent, or Firm* — MERCHANT & GOULD P.C.

(57) ABSTRACT

An urban transformation and construction method is disclosed that creates a tropical style swimming lagoon at vacant and/or abandoned sites. The transformation includes demolishing at least part of the vacant or abandoned site, excavating material from within the site; forming a basin for a large water body having a surface area of at least 3,000 m2, and constructing water containment walls on a first section of the basin to form a waterfront perimeter. The shape of the waterfront perimeter is mainly curved, the basin has a maximum width of 300 meters, and the bottom is covered with a non-permeable material. A sloped access area is constructed in a second section of the basin to form a beach. A barrier is constructed to control access into the area including the beach. At least one recreational facility is
(Continued)

constructed including restaurants, bars, kiosks, stores, and/or cafes about the waterfront perimeter.

22 Claims, 10 Drawing Sheets

Related U.S. Application Data which is a continuation of application No. 16/725,998, filed on Dec. 23, 2019, now Pat. No. 11,098,495, which is a continuation-in-part of application No. 16/538,273, filed on Aug. 12, 2019, now Pat. No. 10,724,260.

(60) Provisional application No. 62/785,086, filed on Dec. 26, 2018.

(51) Int. Cl.
| | |
|---|---|
| *E04H 3/02* | (2006.01) |
| *E04H 3/12* | (2006.01) |
| *E04H 3/22* | (2006.01) |
| *E04H 4/14* | (2006.01) |
| *G06Q 50/08* | (2012.01) |
| *G06Q 20/04* | (2012.01) |
| *G06Q 50/16* | (2012.01) |

(52) U.S. Cl.
CPC .............. *E04H 3/22* (2013.01); *E04H 4/144* (2013.01); *E04H 4/148* (2013.01); *G06Q 50/08* (2013.01); *E04H 2004/146* (2013.01); *G06Q 20/045* (2013.01); *G06Q 50/165* (2013.01)

(56) References Cited

U.S. PATENT DOCUMENTS

| | | |
|---|---|---|
| 2,071,520 A | 2/1937 | Harrison |
| 3,596,996 A | 8/1971 | Carter |
| 3,673,751 A | 7/1972 | Boassy et al. |
| 3,695,434 A | 10/1972 | Whitten, Jr. |
| 3,739,539 A | 6/1973 | Posnick |
| 3,823,690 A | 7/1974 | Rynberk |
| 3,832,814 A | 9/1974 | Teschner |
| 3,990,250 A | 11/1976 | Howard |
| 4,263,759 A | 4/1981 | Miller |
| 4,686,799 A | 8/1987 | Kwake |
| 4,843,658 A | 7/1989 | Hodak |
| 4,976,088 A | 12/1990 | Powers |
| 5,139,853 A | 8/1992 | Mathieson et al. |
| 5,143,623 A | 9/1992 | Kroll |
| 5,800,272 A | 9/1998 | Pons |
| 6,168,532 B1 | 1/2001 | McCaffrey |
| 6,317,901 B1 | 11/2001 | Corpuel |
| 6,764,139 B1 | 7/2004 | Wortman |
| 7,036,449 B2 | 5/2006 | Sutter |
| 7,717,569 B2 | 5/2010 | Sokeila et al. |
| 7,820,055 B2 | 10/2010 | Fischmann Torres |
| 8,062,514 B2 | 11/2011 | Fischmann Torres |
| 8,070,942 B2 | 12/2011 | Fischmann Torres |
| 8,347,556 B2 | 1/2013 | Stelmaszek et al. |
| 8,454,838 B2 | 6/2013 | Fischmann T. |
| 8,465,651 B2 | 6/2013 | Fischmann T. |
| 8,518,269 B2 | 8/2013 | Fischmann T. |
| 8,544,220 B2 | 10/2013 | Milani |
| 8,555,557 B2 | 10/2013 | Hosking et al. |
| 8,753,520 B1 | 6/2014 | Fischmann |
| 8,790,518 B2 | 7/2014 | Fischmann Torres |
| 9,051,193 B2 | 6/2015 | Fischmann T. |
| 9,062,471 B2 | 6/2015 | Fischmann T. |
| 9,080,342 B2 | 7/2015 | Fischmann T. |
| 9,470,007 B2 | 10/2016 | Fischmann Torres |
| 9,470,008 B2 | 10/2016 | Fischmann |
| 9,708,822 B2 | 7/2017 | Fischmann Torres |
| 9,920,498 B2 | 3/2018 | Fischmann |
| 9,957,693 B2 | 5/2018 | Fischmann Torres et al. |
| 10,072,430 B2 | 9/2018 | Nasibov |
| 10,358,837 B2 | 7/2019 | Khamis et al. |
| 10,364,585 B2 * | 7/2019 | Fischmann ............... C02F 1/40 |
| 10,428,542 B1 | 10/2019 | Jackson et al. |
| 10,472,839 B2 | 11/2019 | Khamis et al. |
| 10,486,074 B2 | 11/2019 | Fischmann |
| 10,521,870 B2 | 12/2019 | Fischmann |
| 10,724,260 B2 | 7/2020 | Fischmann |
| 10,982,400 B2 | 4/2021 | Rodriguez Larreta et al. |
| 10,994,215 B2 | 5/2021 | Fischmann |
| 10,997,683 B2 | 5/2021 | Fischmann |
| 10,997,684 B2 | 5/2021 | Fischmann |
| 11,015,333 B2 | 5/2021 | Fischmann |
| 11,098,495 B2 | 8/2021 | Fischmann |
| 11,123,645 B2 | 9/2021 | Fischmann |
| 11,132,663 B2 | 9/2021 | Fischmann |
| 11,167,218 B2 | 11/2021 | Fischmann |
| 11,186,981 B2 | 11/2021 | Fischmann |
| 11,250,533 B2 | 2/2022 | Fischmann |
| 11,270,400 B2 | 3/2022 | Fischmann |
| 11,280,099 B2 | 3/2022 | Fischmann |
| 11,669,929 B2 | 6/2023 | Fischmann |
| 11,732,493 B2 | 8/2023 | Fischmann |
| 2001/0018370 A1 | 8/2001 | Arie |
| 2003/0228195 A1 | 12/2003 | Mizutani |
| 2007/0181498 A1 | 8/2007 | Kaas |
| 2007/0196173 A1 | 8/2007 | Shehan |
| 2007/0248414 A1 | 10/2007 | Fratianni |
| 2008/0021776 A1 | 1/2008 | Lochtefeld |
| 2008/0116142 A1 | 5/2008 | Fischmann Torres |
| 2008/0127574 A1 | 6/2008 | Yi |
| 2010/0146869 A1 | 6/2010 | Stelmaszek et al. |
| 2011/0108490 A1 | 5/2011 | Fischmann Torres |
| 2012/0024796 A1 | 2/2012 | Fischmann T. |
| 2012/0061967 A1 | 3/2012 | Chaganti et al. |
| 2012/0102874 A1 | 5/2012 | Milani |
| 2012/0131861 A1 | 5/2012 | Hosking et al. |
| 2012/0255113 A1 | 10/2012 | Osterman et al. |
| 2012/0291193 A1 | 11/2012 | Panchal |
| 2013/0074254 A1 | 3/2013 | Payne et al. |
| 2014/0228138 A1 | 8/2014 | Scott |
| 2015/0125212 A1 | 5/2015 | Fischmann |
| 2015/0166361 A1 | 6/2015 | Fischmann |
| 2015/0240506 A1 | 8/2015 | Ruhmann et al. |
| 2016/0177586 A1 | 6/2016 | Nasibov |
| 2019/0169867 A1 | 6/2019 | Khamis et al. |
| 2019/0169870 A1 | 6/2019 | Khamis et al. |
| 2019/0232180 A1 | 8/2019 | Fischmann |
| 2019/0236744 A1 | 8/2019 | Fischmann |
| 2019/0355083 A1 | 11/2019 | Fischmann |
| 2020/0023281 A1 | 1/2020 | Fischmann |
| 2020/0023282 A1 | 1/2020 | Fischmann |
| 2020/0027186 A1 | 1/2020 | Fischmann |
| 2020/0032502 A1 | 1/2020 | Fischmann |
| 2020/0032503 A1 | 1/2020 | Fischmann |
| 2020/0047076 A1 | 2/2020 | Fischmann |
| 2020/0051057 A1 | 2/2020 | Fischmann |
| 2020/0074577 A1 | 3/2020 | Fischmann |
| 2020/0074579 A1 | 3/2020 | Fischmann |
| 2020/0208423 A1 | 7/2020 | Fischmann |
| 2020/0208424 A1 | 7/2020 | Fischmann |
| 2020/0208425 A1 | 7/2020 | Fischmann |
| 2020/0283979 A1 | 9/2020 | Gomes De Oliveira |
| 2022/0170281 A1 | 6/2022 | Fischmann |
| 2022/0178159 A1 | 6/2022 | Casadio |
| 2022/0188960 A1 | 6/2022 | Fischmann |
| 2023/0057876 A1 | 2/2023 | Fischmann |
| 2023/0058612 A1 | 2/2023 | Fischmann |

FOREIGN PATENT DOCUMENTS

| | | |
|---|---|---|
| CN | 1865631 A | 11/2006 |
| EP | 1 561 495 A1 | 8/2005 |
| JP | 2002-309539 A | 10/2002 |

(56) References Cited

FOREIGN PATENT DOCUMENTS

| WO | 2006/116745 A2 | 11/2006 |
|---|---|---|
| WO | 2020/139864 A1 | 7/2020 |

OTHER PUBLICATIONS

Beaches Negril, Beaches Resorts by Sandals <https://www.beaches.com/resorts/negril/maps/> (Year: 2020).
Busbee, Jay, The wild, weird stories of Lake Lloyd at Daytona International Speedway, <https://sports.yahoo.com/blogs/nascar-from-the-marbles/the-wild--weird-stories-of-lake-lloyd-at-daytona-international-speedway-220533641.html> (Year: 2015).
Challenge Daytona, <https://challenge-daytona.com/challengedaytona-swim/> (Year: 2020).
Crystal Lagoons, Crystal Lagoons at Epperson Groundbreaking with Review Masterplan, https://www.youtube.com/watch?v=U6ev1uFZ8XM, 2 pages (Jul. 25, 2017).
Daytona International Speedway, Wikipedia, https://web.archive.org/web/20180912065408/https://en.wikipedia.org/wiki/Daytona_International_Speedway, 14 pages (Sep. 9, 2018).
Gameng, Monica, Construction of URBNSURF Melbourne to support 300 jobs, <https://blog.plantminer.com.au/construction-of-urbnsurf-melbourne-to-support-300-jobs>, Feb. 23, 2018 (Year: 2018).
Geico Camping, <https://www.daytonainternationalspeedway.com/Events/2019/Circle-K-Firecracker-250/GEICO-Camping.aspx> (Year: 2020).
International Search Report and Written Opinion for Application No. PCT/IB2018/001089 mailed Jan. 17, 2019.
International Search Report and Written Opinion for Application No. PCT/IB2018/001084 mailed Jan. 29, 2019.
International Search Report and Written Opinion for Application No. PCT/IB19/00919 mailed Feb. 12, 2020.
International Search Report and Written Opinion for Application No. PCT/US2019/068419 mailed Mar. 4, 2020.
International Search Report and Written Opinion for Application No. PCT/US19/68410 mailed Mar. 24, 2020.
International Search Report and Written Opinion for Application No. PCT/US19/68414 mailed Apr. 1, 2020.
Jamindan, Blue Oyzer Cult Santa Cruz CA Boardwalk, https://www.youtube.com/watch?v=XScGHOPS8g0, 2 pages (Aug. 25, 2012).
Maps, Daytona International Speedway, <https://www.daytonainternationalspeedway.com/Plan-Your-Visit/Maps.aspx> (Year: 2020).
Martinelli, Michelle, Why NASCAR's Daytona track has its own massive lake, <https://ftw.usatoday.com/2019/02/nascar-daytona-500-lake-lloyd-truex-bowyer> (Year: 2019).
Pitz, Taylor, Huntington Beach Responds with Reforms for US Open of Surfing 2014, <https://www.theinertia.com/surf/the-us-open-of-surfing-2014/>, referred to herein as "Huntington Beach Surf Comp" (2013).
"Public Access Lagoons" (Crystal Lagoons) retrieved from https://web.archive.org/web/20180727155828/https://www.crystal-lagoons.com/public-access-lagoons/>, 1 page (Jul. 27, 2018).
Rentafloat by Europonton GmbH <https://www.rentafloat.eu/en/pontoon-systems/floating-stages> (Year: 2017).
Six Flags Great America, https://www.sixflags.com/greatamerica/attractions/water-park-rides, 1 page (Dec. 16, 2018).
Six Flags Great America, Wikipedia, https://en.wikipedia.org/wiki/Six_Flags_Great_America, 26 pages (Feb. 18, 2020).
Surfing at URBNSURF, empireave.com (Year: 2019).
"Treasure Bay Bintan" [online] Retrieved from the Internet: <URL: https://www.treasurebaybintan.com>, copyright 2016, 12 pages.
URBNSurf https://urbnsurf.com/parkoverview>, accessed 2020 (Year: 2020).
URBNSURF, "Welcome To URBNSURF". Retrieved from the Internet: <URL:https://www.facebook.com/urbnsurf/videos/1773008676245450/>, published on Facebook on Jun. 8, 2016, 2 pages.
URBNSurf You tube video, <https://www.youtube.com/watch?time_continue=64&v=tH2MLBdea5g&feature=emb_logo>, published Feb. 21, 2018 (2018).
Valera, 12 Incredible Artificial and Man-Made Beaches, The Weather Channel (Year: 2017).
Walk on Water: Over Pool Flooring Systems <https://web.archive.org/web/20171216162429/http:l/walkonwaterentertainment.com/ (Year: 2017).

\* cited by examiner

URBAN TRANSFORMATION AND CONSTRUCTION METHOD FOR CREATING A PUBLIC ACCESS TROPICAL STYLE SWIMMING LAGOON WITH BEACHES WITHIN VACANT OR ABANDONED SITES

This application is a continuation-in-part of U.S. patent application Ser. No. 17/360,328 filed Jun. 28, 2021, which is a continuation of U.S. patent application Ser. No. 16/725,998, filed Dec. 23, 2019, now U.S. Pat. No. 11,098,495, which is a Continuation-in-Part of U.S. patent application Ser. No. 16/538,273, filed Aug. 12, 2019, now U.S. Pat. No. 10,724,260, which claims benefit of U.S. Provisional Ser. No. 62/785,086, filed Dec. 26, 2018 and which applications are incorporated herein by reference. To the extent appropriate, a claim of priority is made to each of the above disclosed applications.

FIELD OF THE INVENTION

The present invention relates generally to an urban transformation and construction method for creating a public access tropical-style swimming lagoon with turquoise crystal clear waters within vacant or abandoned sites, for swimming and the practice of water sports, wherein a portion of the vacant site is demolished in order to generate a swimming lagoon. Preferably, there is at least an area of the swimming lagoon where public access is controlled, and a beach area is located within the controlled access area.

BACKGROUND OF THE INVENTION

Around the world, as cities and urban spaces keep growing, a series of vacant and/or abandoned sites have been left in between all this urban development, which may be vacant or abandoned due to limited uses.

As a reference, it has been estimated that in the U.S., on average, fifteen percent of a city's land is deemed vacant, including varying types of land, ranging from undisturbed open space to abandoned, contaminated brownfields (Pagano et al, 2000). This is especially true for cities on the south of the U.S., with more than 19% of its land deemed vacant, which is mostly due to cities that have experienced high levels of population and land area growth. While cities expand, there are a lot of lots and spaces that are left undeveloped, and end up becoming vacant land. On average in the U.S., cities had 12,367 acres of usable vacant land, with a median amount of usable vacant land of 4,499 acres.

Generally, it has been considered that vacant lots are associated with depressed real estate value, crime, trash, abandonment, poor landscape, and general economic and/or social failure, where vacant lots tend to be perceived very negatively. Vacant lots can devastate a neighborhood, undermine the neighbors' quality of life, diminish the value of nearby properties, and reduce local tax revenue. In this aspect, it has been studied that vacant and abandoned properties have increased crime rates and declining property values, in addition to the fact that their maintenance or demolition (for abandoned structures) has a high cost that has to be paid by the cities.

Some vacant land sites are sites that have been projected for the construction of public parks, categorized for open space recreation or green areas, but have not been developed and result in abandoned and desert sites. In addition to strictly vacant land, green spaces, such as public parks that are underutilized or that are not maintained properly can also be considered as relatively vacant land as they have the same negative effects on the community.

It has been studied that the reuse of vacant land and abandoned structures can represent an opportunity for the economic growth and recovery of a diverse range of urban areas. This is true for all cities, independently of population and city size.

As used herein, vacant and/or abandoned sites refer to sites and/or lots that not only are vacant or have abandoned structures but it also includes parks or sites that have limited uses or sites that have constructive limitations. For example, this can represent green areas of private projects with low use and land that does not allow constructing high rises or tall buildings, very low usage density lots, or land that requires of very long permitting and approval processes to transform into real estate or commercial projects, among others.

For example, thousands of abandoned and/or vacant sites have been converted to community gardens and parks. The relatively trending phenomenon called "greening" consists of transforming vacant lots into green spaces that are environmentally friendly, with final uses as community gardens and tree farms for example. The transformation of vacant land could provide increased green space for urban gardening and recreation, as well as other uses for urban relief.

The requirement for these types of green areas has grown over the years, while population in urban locations keeps growing and therefore needs of open-air locations that can provide a relaxing setting as well as allowing to perform recreational activities such as running, exercising, among others. In general, these green spaces also have positive effects over its surroundings, such as for example increasing the value of surrounding real estate and the development of new markets (for example commercial development nearby parks), as well as improving health of users and having environmental benefits, which is the complete opposite of the negative effects created by vacant or abandoned lots.

Cities that have increased urban development and with high population concentration could greatly benefit of the transformation of such vacant or abandoned lots, especially since they have few opportunities for new green space development through other means. However, the transformation of vacant or abandoned sites into community spaces has not taken off considerably, not taking advantage of these underutilized spaces to improve urban quality of life and that also have positive environmental effects. Many of the transformation alternatives, including gardens and similar, have not succeeded considerably, and a large number of vacant and/or abandoned sites still exists around the world.

The stress in large cities and urban lifestyle has a large impact on people, who therefore look for different settings and lifestyle to relax. In this same point, it is important to mention that there has been an explosive increase in worldwide tourism over the years that has substantially increased its carbon footprint (See FIG. 01 that shows the increase of tourists over the years). This is mainly because people have to travel long distances and use their car, or have to fly, or use other transport means to be able to reach waterfront settings and beach areas, sometimes having to travel hundreds of miles to be a part of a beautiful waterfront beach setting, in result having a very large carbon footprint due to all of this movement. This is especially relevant today, where society has become very aware of carbon footprint, where travel is one of the big contributors of carbon emissions.

With urban locations being very hectic and stressful, the urban population is having increasing demands for open recreational spaces where they can relax, practice sports, and enjoy of beautiful scenery and spaces. Congregation spaces are scarce, and the old tradition of congregating in shopping malls or retail facilities has shifted into a search for open and natural settings.

Therefore, there are many current vacant and/or abandoned spaces that are poorly used or have limited uses, that are relatively well connected urban locations, and that do not have aesthetical features sought out by people such as recreational uses and beautiful settings.

SUMMARY

Therefore, according to one embodiment there is provided an urban transformation construction method for creating a tropical-style swimming lagoon with a sloped access at vacant and/or abandoned sites, the method comprising: demolishing at least part of the vacant or abandoned site, wherein the demolition process includes excavating at least a 15 cm to 6 meter layer; excavating material having a volume of at least 4,000 m3 from an area within the site; forming a basin for a large water body having a surface area of at least 3,000 m2 and a minimum depth of at least 1.4 meters at its deepest point, wherein earthworks for the basin are created within the surrounding site perimeter, and wherein the basin includes a basin perimeter and a bottom; constructing water containment walls on at least one section of the basin perimeter to form a waterfront perimeter, wherein the shape of the waterfront perimeter is mainly curved and the basin has a maximum width of 300 meters; covering the bottom of the basin with a non-permeable material not including thick concrete like conventional swimming pools; constructing a sloped access area on at least one section of the basin perimeter to form a beach access into the large water body; constructing one or more barriers around the basin perimeter to cordon off an area to establish a controlled access area, wherein the controlled access area includes a beach access perimeter, and the barriers include at least one access point to selectively allow users into the controlled access area, whereby the users allowed entry into the controlled access area are able to use the beach access; and constructing at least one additional recreational facility comprising food and beverage and commercial facilities such as restaurants, bars, kiosks, stores, cafes among others in the vicinity of the waterfront perimeter.

These and other variations of the invention will become apparent to those skilled in the art upon a more detailed description of the invention. The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

DESCRIPTION OF THE FIGURES

Referring to the drawings, wherein like numerals represent like parts throughout the several views:

FIG. 4 shows a side view of another embodiment of the containment walls 6 for the basin of the swimming lagoon 2, showing backfill material 7 to provide structural stability to the containment wall, and wherein a non-permeable material 9 contains the water within the large water body, and is located on top of the bottom soil 8. FIG. 5 illustrates an embodiment in which the depth of the lagoon 2 near the wall is relatively deep.

FIG. 5 shows a side view of an embodiment of a sloped access 5 to the basin of the swimming lagoon 2, wherein a support slab 10 is provided underneath a portion of the sloped access 5, and the non-permeable material 9 for containing the water in the large water body.

DETAILED DESCRIPTION OF THE INVENTION

Figure 1:
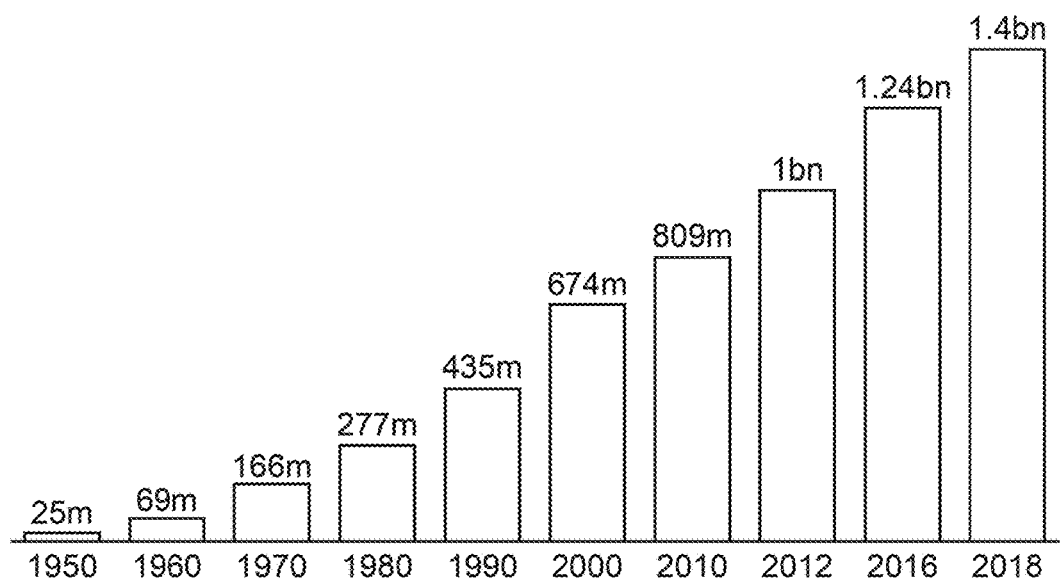
FIG. 1 shows the number of international tourist arrivals given by the World Tourism Organization in 2017, referring to the number of inbound journeys by international tourists to a country outside the destination they live in for a duration of less than a year.
Figure 2:
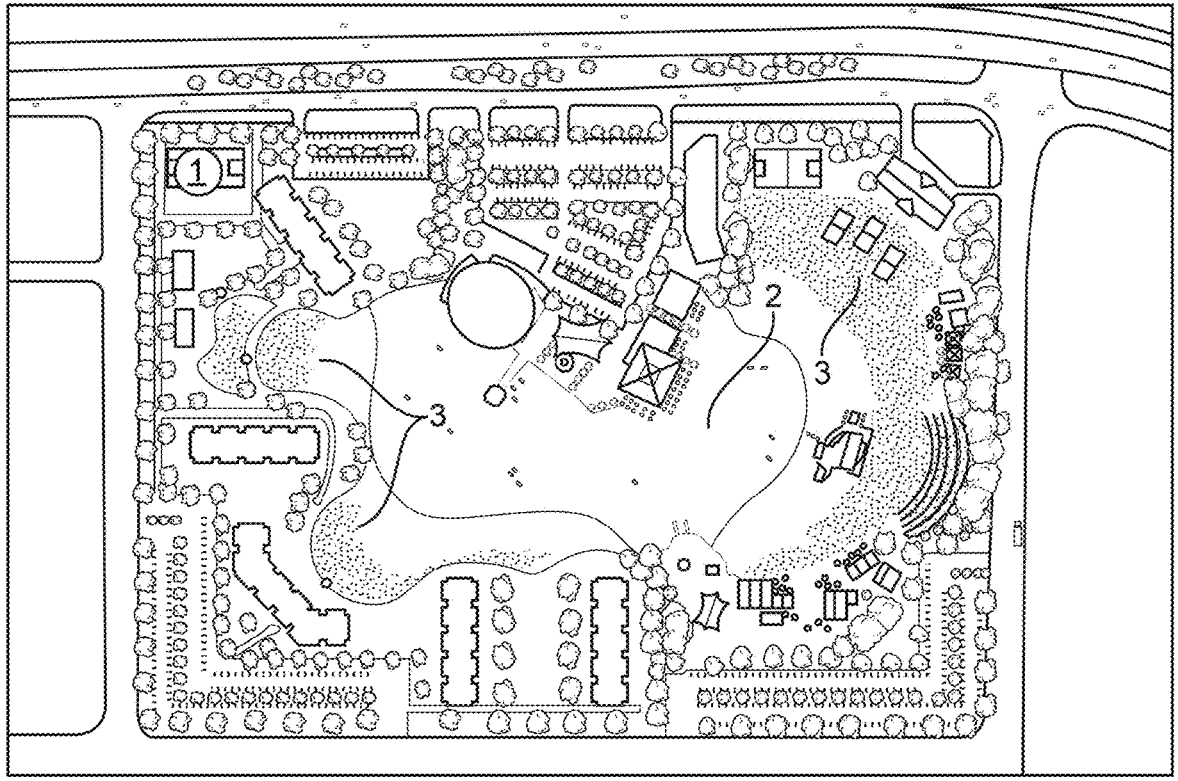
FIG. 2 shows an aerial view of an embodiment of the invention after applying the method from the present invention that allows to transform an urban location such as a vacant or abandoned site (1) into an urban beach where a tropical-style swimming lagoon (2) can be seen, having at least one beach area (3).
Figure 3:
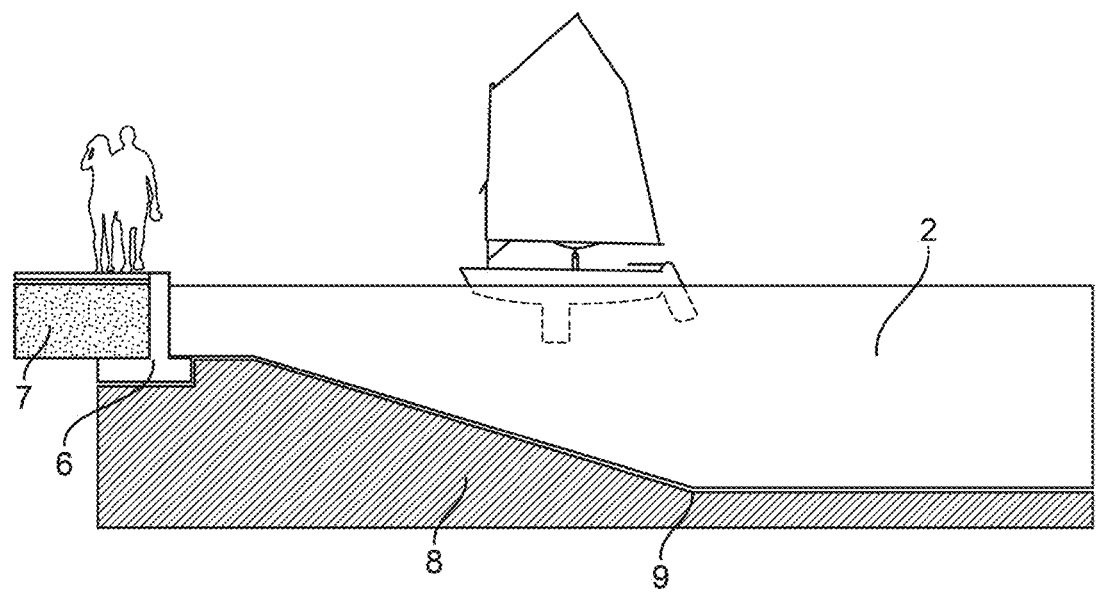
FIGS. 3 and 4 show side views of embodiments of the containment walls 6 for the basin of the swimming lagoon 2. First referring to FIG. 2, backfill material 7 is included to provide structural stability to the containment wall 6. A non-permeable material 9 contains the water in the large water body (e.g., the swimming lagoon 2), and is located on top of the bottom soil 8.
Figure 4:
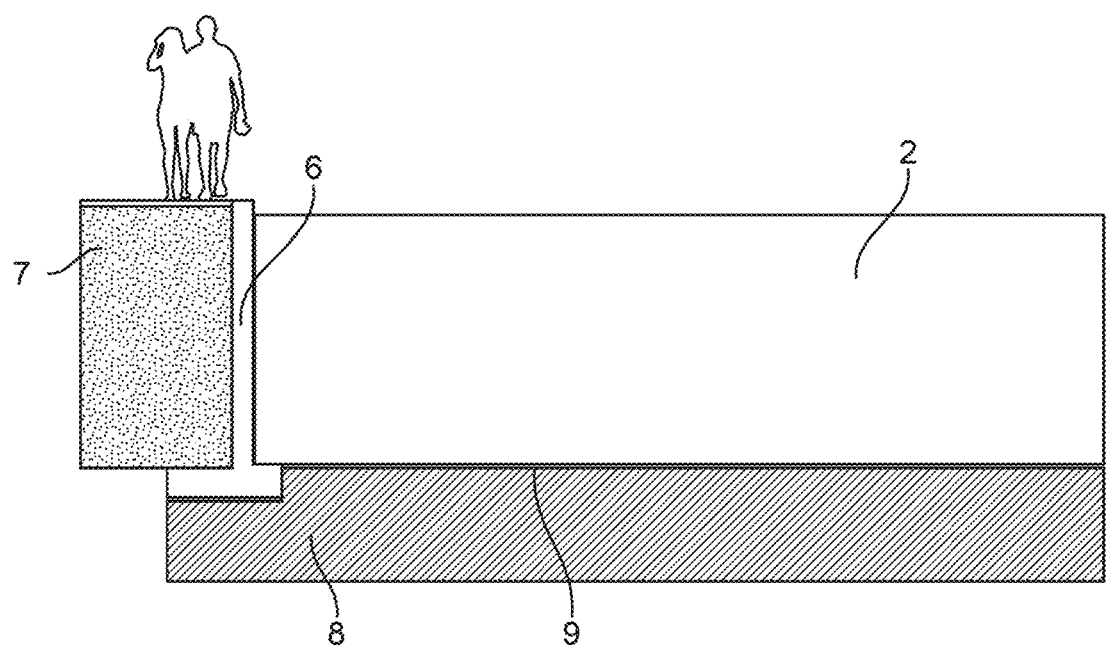
Figure 5:
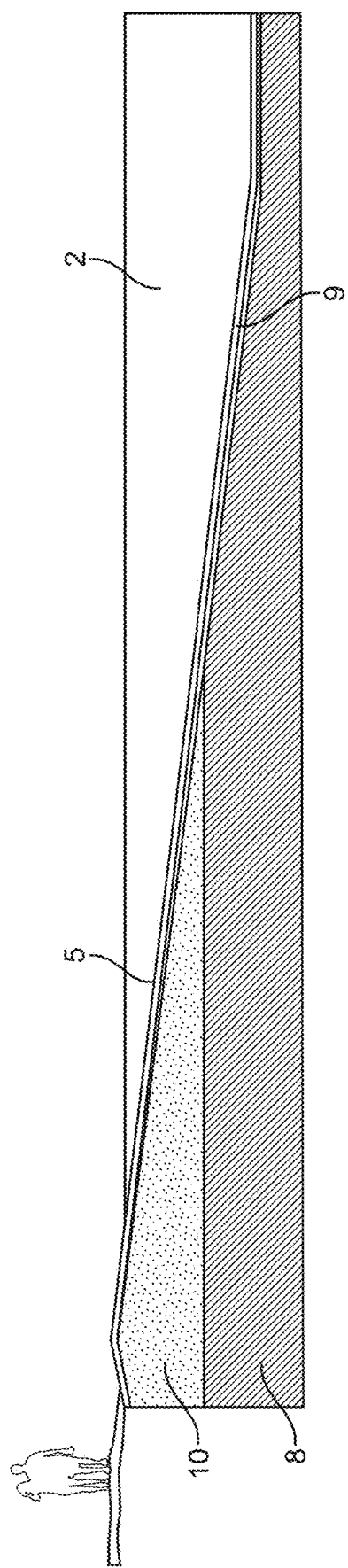
FIG. 5 illustrates an embodiment in which the depth of the lagoon 2 near the wall is relatively shallow. Next
Figure 6:
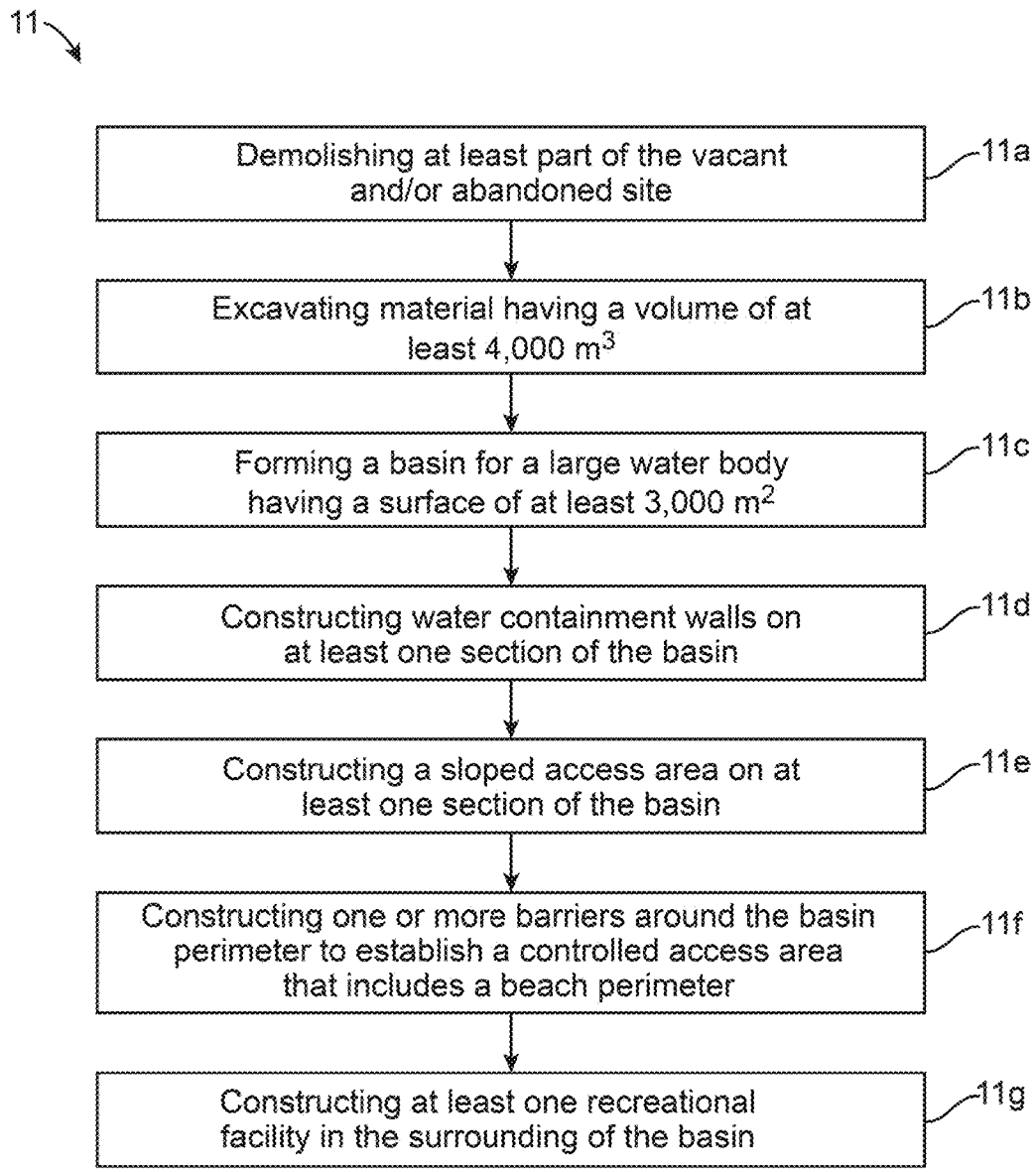
FIG. 6 shows a preferred construction method 11 in accordance with the principles of the present invention. The first step 11a is to demolish at least part of the vacant and/or abandoned site. The next step 11b is to excavate materials having a volume of at least 4,000 m3. Then at step 11c a basin is formed for large water body having a surface area of at least 3,000 m2, this may include in part earthworks from the excavated material and/or from additional materials brought to the site. At step 11d, water containment walls are constructed on at least one section of the basin. At step 11e, a sloped access area in at least one section of the basin is optionally created in the event a swimming area is included. At 11f, barriers are constructed around the basin perimeter to establish a controlled access area for a beach or other area in which user controlled access is desired. At step 11g, at least one additional recreational facility is constructed.
Figure 7:
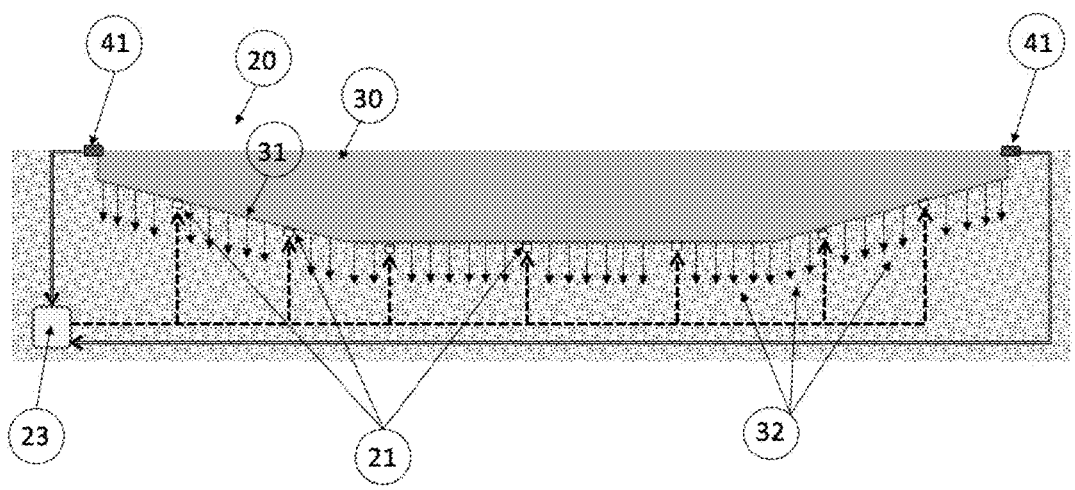
FIG. 7 shows a schematic embodiment of a centerpiece lagoon constructed in accordance with the invention, showing a reduced number of bottom inlets (21), a high-frequency reduced skimmer system (41) a reduced filtration system (23), and micro-leakage water flows (32) flowing through micro-leakage points (31) of the micro-renewal system (30). The low-frequency skimmer system LFSS (42) is not shown.
Figure 8:
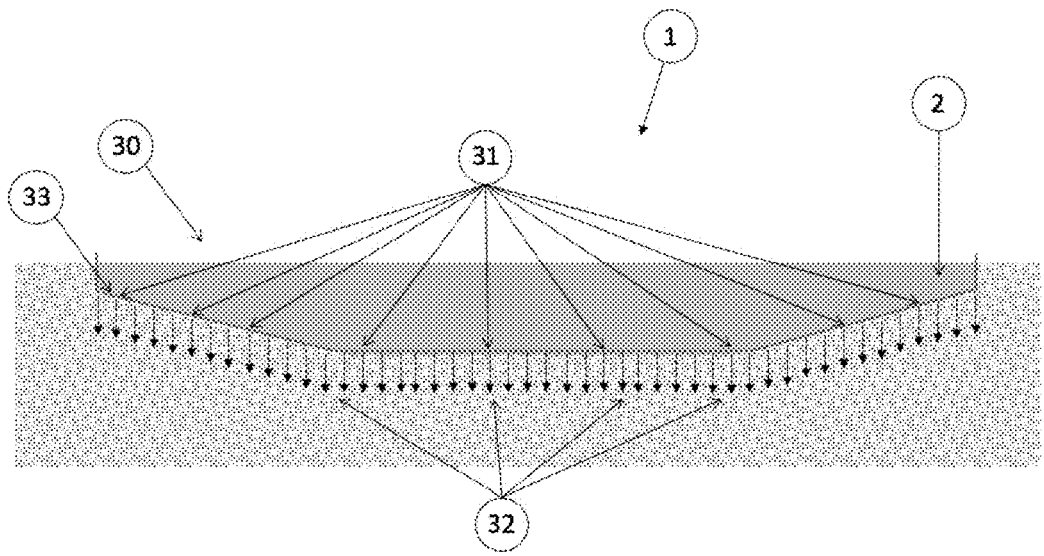
FIG. 8 shows a schematic embodiment of a centerpiece lagoon constructed in accordance with the invention comprising a plurality of micro-leakage points (31) within its inner surface, which allow to remove water from the lagoon since each micro-leakage point (31) has an associated micro-leakage point water flow (32) that is being removed from lagoon and into the excavated soil or filling material (3). The low-frequency skimmer system (LFSS) is not shown.
Figure 9:
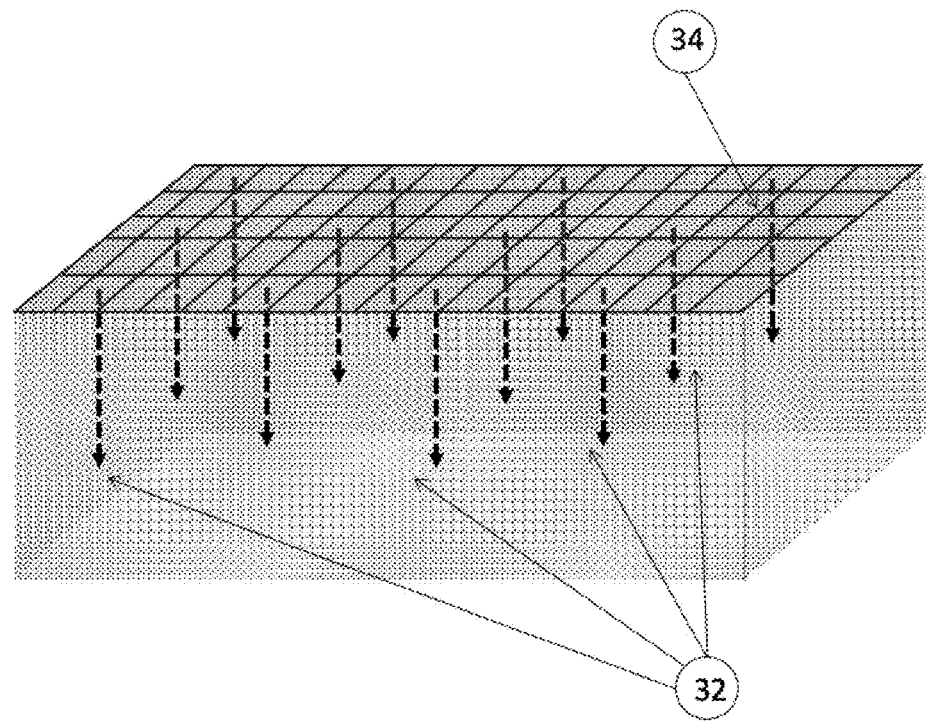
FIG. 9 shows an enlarged section of an embodiment of the micro-renewal system (30) constructed in accordance with the invention, wherein a micro-leakage material (33) is a grid material (34) and is used in the inner surface of the structure, which allows to create micro-leakage points (31) to achieve a micro-leakage flow (32) that is removed from the structure into the excavated soil or filling material (3).
Figure 10:
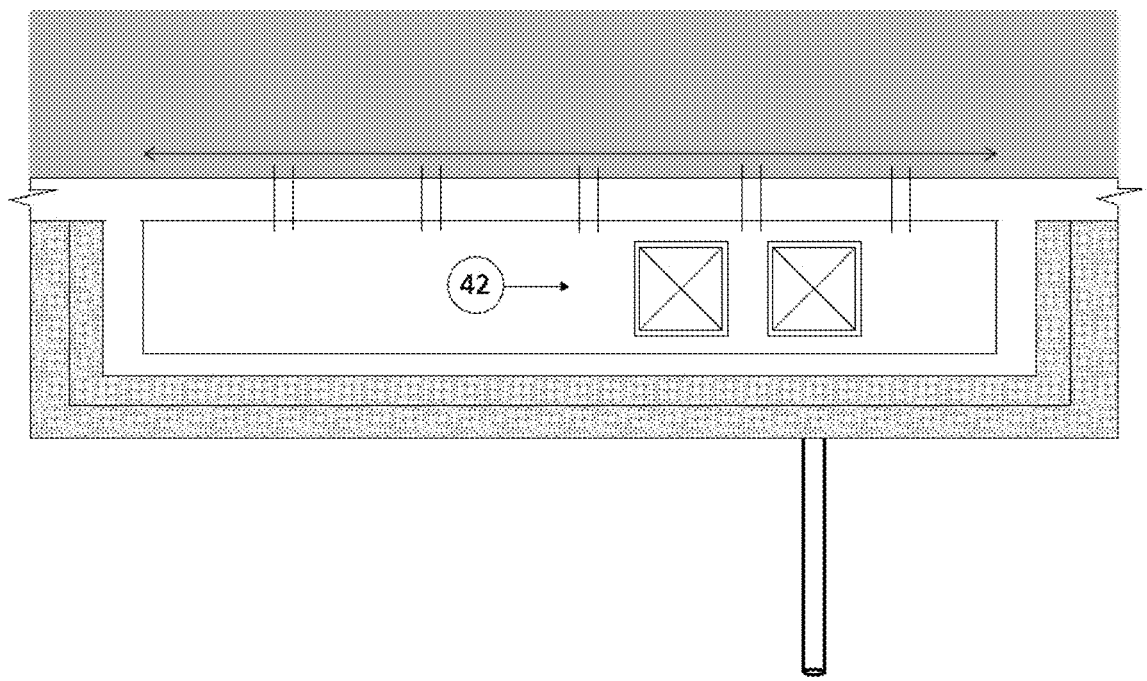
FIG. 10 shows a schematic aerial partial top view of a centerpiece lagoon as well as the low-frequency skimmer system LFSS (42) and one discharge water pipe (6).
Figure 11:
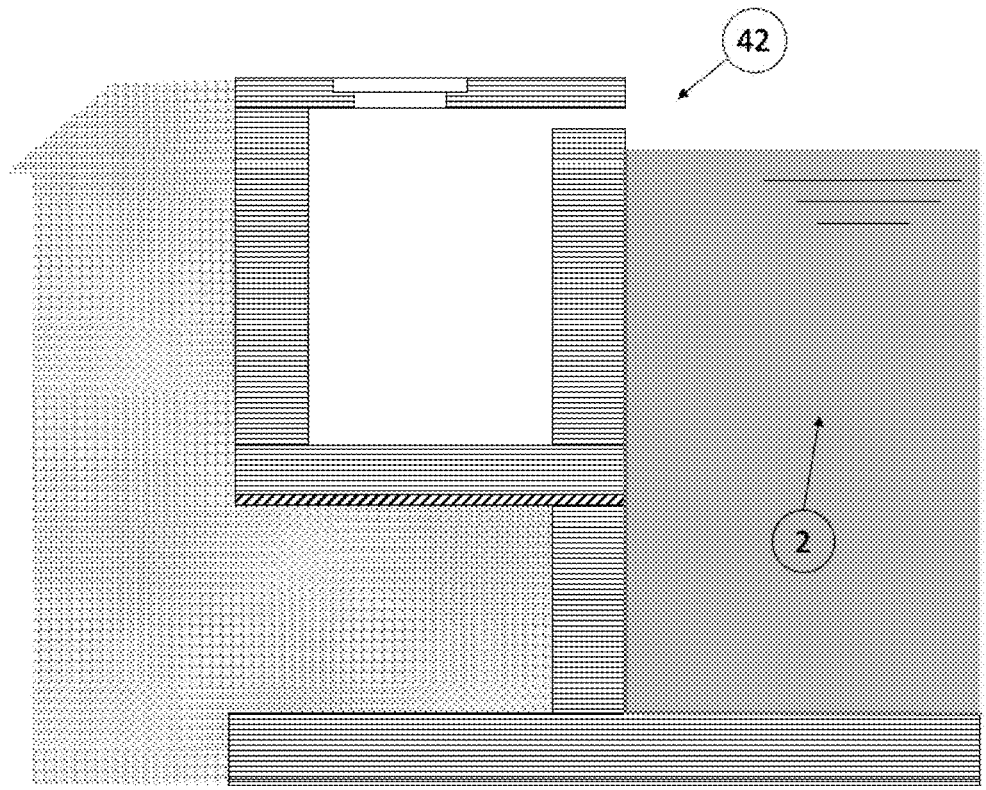
FIG. 11 shows a schematic side view of an embodiment of the low-frequency skimmer system LFSS (42) constructed in accordance with the invention and an opening that is located above the water level.
Figure 12:
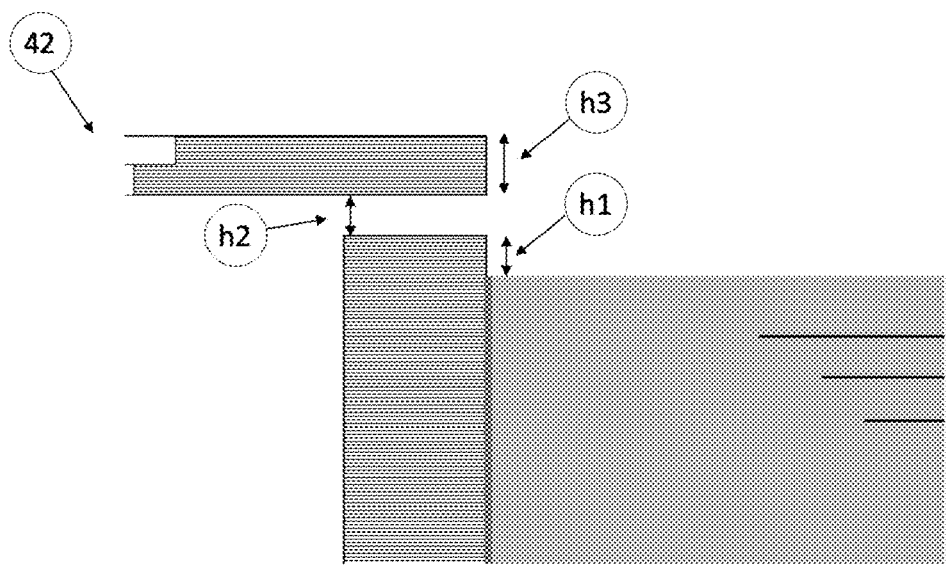
FIG. 12 shows a schematic enlarged side view of an embodiment of the low-frequency skimmer system LFSS (42), and referential heights h1, h2, and h3 that denote a distance from the water level to the lower weir opening point, the height of the weir opening, and the thickness of the weir upper structure, respectively.
Figure 13:
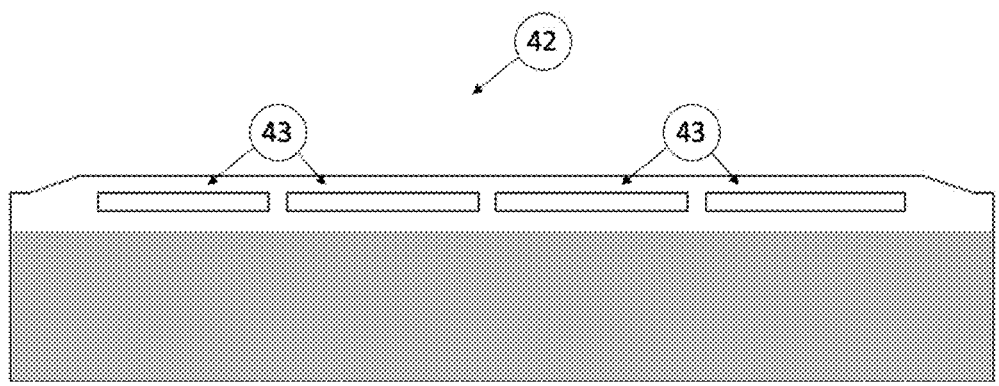
FIG. 13 shows a schematic front view of an embodiment of the LFSS (42), having four weir structures (43) being located with openings above the water level of centerpiece lagoon.
Figure 14:
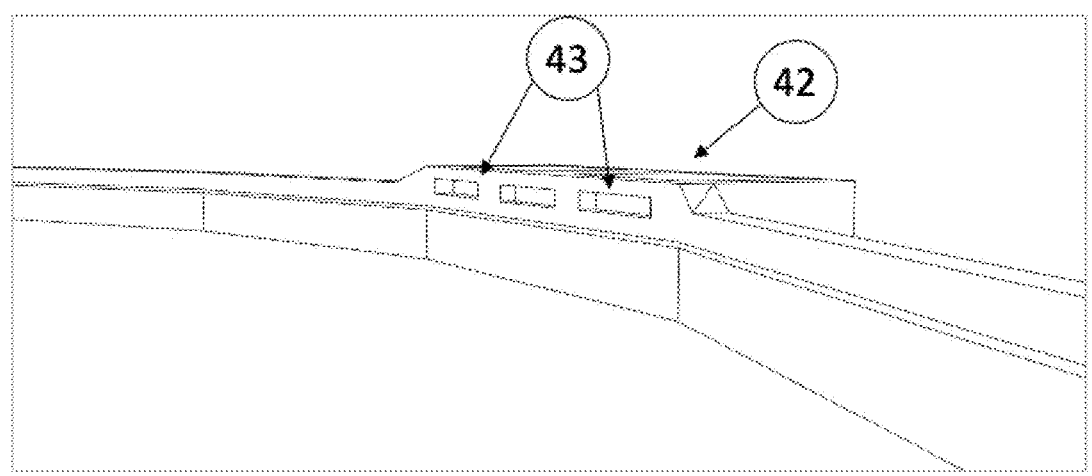
FIG. 14 shows a schematic lateral view of an embodiment of the LFSS (42), having three weir structures (43).
Figure 15:
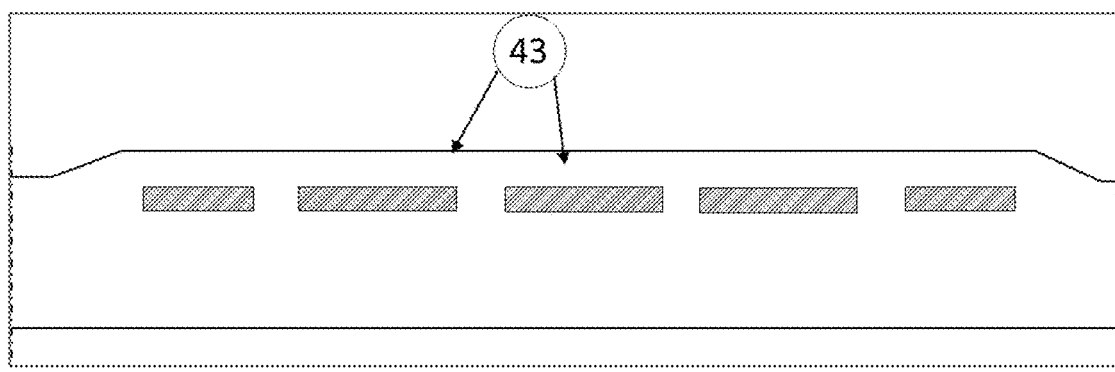
FIG. 15 shows a schematic front view of an embodiment of the LFSS (42), having weir structures (43) being located with openings above the water level of centerpiece lagoon.

The method from the present invention, as seen in FIG. 2, allows to, in an innovative way, transform vacant or abandoned sites that are located in urban areas and generally have good connectivity, in order to provide beautiful beach-like settings that can help solving the need for more recreational urban open air spaces and tourism needs with a lower carbon footprint and therefore become a completely new and radical trend that can change the lifestyle of people around the world. The present invention helps solving the need for providing recreational settings with activities that can change the lifestyle of urban population around the world while at the same time helps solving the problem associated with vacant or abandoned lots and its negative effects over the community.

The present invention relates generally to an urban transformation and construction method for creating a controlled access tropical-style swimming lagoon with crystal clear turquoise waters and with beaches at vacant or abandoned sites, for swimming and the practice of water sports, wherein a portion of the vacant or abandoned site is demolished in order to generate a swimming lagoon according to designs, construction parameters and configurations. Preferably, there is at least an area of the swimming lagoon where public access is controlled, and a beach area is located within the controlled access area.

The present invention discloses a construction method for creating a tropical style swimming lagoon in vacant or abandoned sites to repurpose such spaces by creating a recreational venue with at least one tropical-style swimming lagoon and additional amenities.

The construction method from the present invention is low cost compared to the construction of other facilities in the same spaces such as shopping malls, amusement parks, water parks, or similar installations.

As used herein, tropical-style refers to clear water lagoons with round shapes, that are suitable for direct contact recreational purposes, and that usually have turquoise colored crystal clear waters and that do not have visible macro algae presence or a green water tonality like artificial lagoons and lakes located in parks and golf courses, among others.

In more detail, the process comprises excavating at least a portion of the vacant or abandoned site to excavate a layer of between 15 cm to 6 meters in order to provide the necessary excavated volume for the swimming lagoon construction.

Optionally, if there are permanent or rigid structures within the site, especially in the case of abandoned lots, demolition can be performed of such structures to allow excavation necessary to build the swimming lagoon. To provide clarity, for the purposes of this application the term demolishing encompasses not only knocking down or tearing down current structures or installations, but also removing debris or non-fixed materials from such zone and digging or excavating a portion of the land as part of the construction method.

The demolition process comprises excavation with machinery up to a depth of 20 centimeters over the final excavation level, where the final 20 cm may be excavated manually.

Once the design excavation level is achieved, the bottom soil must be compacted to achieve a 95% Modified Proctor Density. A 95% Modified Proctor Density means that the soil at the bottom is compacted to 95% of its maximum dry density. This aims to reduce post-construction settlements rates of such soil. As a reference, the Modified Proctor test uses a 4-inch-diameter mold which holds 1/30 cubic feet of soil, and uses a 10 lb. hammer falling through 18 inches, with 25 blows on each of five lifts, for a compaction effort of about 56,250 ft-lb/ft3. This can also be explained such that the bottom of the excavations are to be compacted to a 95% of the Maximum Dry Compacted Density, based on the Modified Proctor test (ASTM D1557-02) when the soil type has more than a 12% material passing under a No 200 mesh (opening of 0.075 mm). When the soil type has less than a 12% material passing under a No 200 mesh (opening of 0.075 mm), the soil must be compacted to achieve no less than 80% of its Relative Density.

The process also includes excavating a volume of at least 4,000 m3, preferably at least 7,000 m3 from an area within the vacant or abandoned site. This excavation material preferably will serve as the earthworks necessary to provide the basin of the swimming lagoon, wherein such earthworks are created within the property perimeter, and wherein the basin includes a basin perimeter and a bottom. It will be appreciated by those of skill in the art that the excavated material may prove to be unsuitable for the earthworks. For example, the material may include a mixture of rocks, cement, tar or other detritus. In such an event, suitable fill and other materials may be brought to the site for the earthworks.

The basin for the lagoon is preferably designed and constructed so that its surface area is at least 3,000 m2, preferably at least 5,000 m2, and more preferably over 10,000 m2 and its deepest point has a minimum depth of 1.4 meters.

It's important to highlight that for the tropical-style swimming lagoon of the present invention, since it has a surface larger than 3,000 m2, conventional swimming pool construction technologies are seldom economically and technically feasible, as for example swimming pool construction requires to have a large and thick concrete structure that comprises a series of inlets and outlets within the walls and bottom of the structure in order to be able to create water movement and circulation that allows to filter the complete water volume at least once per day. This is mainly to have a homogeneous water body so that when withdrawing and filtering the water flow means that the whole water volume is being filtered and there are no dead areas that have no water circulation and would therefore not be filtered efficiently.

For example, regulations for swimming pools around the world require the use of bottom and/or wall nozzles, wherein regulations preferably require the use of bottom inlets to be able to generate proper mixing and circulation of water before it is withdrawn from the pool to send to the filtration system. For example, Florida's swimming pool construction regulations require that inlets be installed so that spacing between floor inlets does not exceed 20 ft. (6 m) and the distance between a bottom inlet and a wall does not exceed 10 ft. (3 m). This means that a 25 m×50 m Olympic pool for example would require more than 35 bottom inlets, and a 3,000 m2 (60 m×60 m) swimming pool would require more than 70 bottom inlets, in addition to wall inlets that would further allow mixing the water volume so that when withdrawing water from the main drains, skimmers, or other withdrawal points and sending such water to the filtration system, it effectively allows to filter the complete water volume of the pool from 1 to 6 times per day (generally 4 times per day based on regulations). The present invention preferably requires that the swimming lagoon has at least 50% less inlets than those required for the filtration system of a conventional swimming pool according to swimming pool standards.

Additionally, as used herein, a conventionally designed and operated swimming pool refers to a swimming pool designed and operated as per Florida's Public Swimming Pool Regulations, which are the regulations promulgated for public swimming pools in the state of Florida, United States of America, with effective date of Jul. 20, 2016, and that are found in Chapter 64E-9 of the Florida Administrative Code.

Containment walls are preferably constructed on at least one section of the basin perimeter, as to form a waterfront perimeter that is arranged and configured to contain the water within the basin. Such containment walls require a backfill material in order to provide structural integrity to such walls.

In addition, a sloped area is preferably constructed in at least one section of the basin perimeter in order to create a beach access perimeter. The sloped area is constructed such that the slope of the beach access perimeter is between 5% and 30%. The sloped area may require construction or placement of a support slab in order to provide structural stability on such location. As an example, a support slab can be built out of reinforced concrete, shotcrete, plastics, or other support materials. For example, the sloped area may have high foot traffic of users accessing the swimming lagoon.

The shape of the waterfront perimeter is preferably curved to create a more natural aspect of the swimming lagoon. Additionally, the basin has a maximum width of 300 meters at its widest point. The width of the lagoon is defined as the measurement or extent of the lagoon from side to side; the lesser of the two dimensions of the lagoon measurements. The length of the lagoon is defined as the largest dimensional measurement of the lagoon.

The maximum width of the lagoon is limited in up to 300 meters, as there is little visual impact of the whole lagoon to be gained at eye level with larger distances.

The bottom of the basin is covered with a non-permeable material, in order to act as a water containment structure. The non-permeable bottom material that covers the bottom of the basin comprises plastic liners, shotcrete, or flexible materials that do not require the use of a thick concrete layer like conventional swimming pools. The use of large surfaces of thick concrete is problematic, as in addition of having high costs, it can generate structural tensions that cause fractures, cracks, settlements in the concrete and may impact the structural properties of the basin.

In a preferred embodiment, the non-permeable material comprises a plastic liner of at least 1 mm of thickness, among other solutions. The plastic liner can have different colors and tonalities, but preferably it has a white, blue or light color which provides an intense turquoise tonality of the water body.

Therefore, the basin, along with its containment walls and/or sloped areas creates a swimming lagoon in the previously excavated volume that forms the basin.

Embodiments herein are directed to a swimming lagoon that is arranged and configured to optimize visitor experience. Specifically, the lagoon is arranged and configured in a way such that the relationship between all elements and purposes of the different areas of the lagoon enable guests and visitors to enjoy the experience as well as interact with the different areas that may be designated for different purposes. A beach area included in the swimming lagoon is preferred. However, there may be instances when a sloped beach access with a swimming area is impractical or is otherwise not desired for the specific site.

Further, the swimming lagoon is also preferably constructed in a manner so that it can be used not only for swimming purposes, but also for the practice of several water sports, such as kayaking, stand-up-paddling, boating, water skiing, among others.

Although the swimming lagoon is man-made, it preferably includes shapes that tend to imitate natural geometries, and comprises a slightly elongated shape to provide visitors with at least one vantage point to experience dramatic views of the lagoon and its surroundings. Preferably, the swimming lagoon is surrounded by vegetation such as plants and trees.

Additionally, the swimming lagoon comprises different elements and areas for providing an optimized visitor experience, preferably including at least one controlled access area. This is achieved by constructing one or more barriers around the basin perimeter of the swimming lagoon, in order to cordon off an area of the swimming lagoon to establish a controlled access area with a restricted access swimming lagoon located within. In that case, the controlled access area includes at least one beach access perimeter within the basin perimeter, thereby providing a new recreational amenity and venue for visitors. The barriers comprise at least one access point to selectively allow users into the controlled access area. The remaining area about the basin perimeter can optionally be an open access area, meaning that is a non-ticketed area, that is freely accessed by users. However, the controlled access area preferably requires a ticket, voucher or other payment of an entry fee for accessing such area which can be included within other fees or payments for example access can be included in seasonal tickets, or by being member of an association or group, being included as part of lodging facilities, among others.

Controlled access areas may be created about the swimming lagoon for other purposes as well. However, in the case there are non-ticketed areas, it is important to include separate access points for both controlled access areas and non-ticketed access areas of the lagoon. This enables visitors to clearly participate in either one or both areas depending on their purpose for visiting the site and lagoon, including natural articulations and man-made focal points along the edge to encourage walkability and foster visitors with a sense of discovery. The swimming lagoon can be illuminated through a lighting system, in order to allow nighttime uses. The lighting system comprises exterior lighting systems and/or underwater systems.

As previously mentioned, it is preferred that the lagoon include at least one controlled access area for visitors for at least one beach area, wherein the beach area comprises a sandy beach and sloped transition into the swimming lagoon. The controlled access area may be designed such that the total beach area to lagoon area ratio is at least 1:2. Further, the beach area is preferably placed and designed considering general summer sun orientation, optimizing visitor experience In another embodiment of the invention, the controlled access area surrounds the entire lagoon surface, and may include additional amenities within the controlled access area, such as recreational facilities including cafes, bars, restaurants, and others.

In an embodiment of the invention, the installations surrounding the tropical-style lagoon is artificially set with a beach theme, including the use of blue and white colors with the inspiration of the beach and beach kiosks and lighthouses.

The swimming lagoon can also be surrounded by vegetation such as plants and trees.

The present invention also includes constructing at least one additional recreational facility comprising food and beverage and commercial facilities that can provide a recreational setting surrounding the tropical-style lagoon. Recreational facilities examples comprise restaurants, bars, kiosks, stores, cafes, restaurants, beach centers, promenades, hotels, entertainment facilities, virtual and immersive experiences, and similar facilities and amenities.

Also, embodiments constructed in accordance with the present invention, the lagoon comprises a low-cost reduced centralized filtration system which has at least one of a lower number of bottom inlets or a lower filtration rate compared a conventional swimming pool, so that a Filtration Efficiency Index of less than 80% of the Swimming Pool Filtration Index is achieved.

As used herein, the low-cost reduced centralized filtration system refers to a system that uses less inlets, outlets, skimmers, and/or filtration equipment than a conventionally designed and operated swimming pool, and therefore is not intended to achieve the same recirculation pattern and/or filtration rate than a conventionally designed centralized swimming pool filtration system. Generally, the low-cost reduced centralized filtration system uses a fewer total number of bottom inlets to return water to the water volume within the structure, also generally requiring a smaller filtration capacity that allows filtering a smaller water volume and providing less homogeneous filtration compared to a conventional swimming pool centralized filtration system. To provide clarity, the low-cost reduced centralized filtration system does not aim at filtering the water from the mobile suction device described herein, but aims at filtering the water volume contained within the lagoon.

Specifically, the low-cost reduced centralized filtration system LCRCFS comprises at least one of a lower number of bottom inlets, or a lower filtration rate compared to a conventionally designed and operated swimming pool, as long as such LCRCFS achieves a Filtration Efficiency Index (FEI) of less than 80% of the Swimming Pool Filtration Index (SPFI) as based in Florida swimming pool regulations as defined below:

$$\text{Filtration Efficiency Index } (FEI) = 100 \times \frac{\#BI \times TRR}{Ws} \quad \text{(Equation 1)}$$

Swimming Pool Filtration Index $(SPFI) =$ (Equation 2)

$$100 \times \frac{\#BI_{FL} \times TRR_{FL}}{Ws}$$

$$FEI \le 0.8 \times SPFI \quad \text{(Equation 3)}$$

Where:
BI is the total number of bottom inlets found in the lagoon
$\#BI_{FL}$ is the total number of bottom inlets of a conventionally designed swimming pool according to Florida Swimming Pool Regulations for the same dimensions of the lagoon
TRR is the theoretical filtration rate which is calculated as the theoretical numeric calculation for the number of times the total volume of water is recirculated and filtered through the low-cost reduced centralized filtration system of the lagoon per day.
$TRR_{FL}$ is the theoretical filtration rate from Florida Swimming Pool Regulations.
Ws is the water surface of the lagoon in square feet.

Therefore, the low-cost reduced centralized filtration system has a Filtration Efficiency Index of less than 0.8 or 80% of the Swimming Pool Filtration Index, which is related to the use of at least one of a lower number of total bottom inlets or a lower filtration rate compared with a conventionally designed and operated swimming pool.

The low-cost reduced centralized filtration system may be able to filter a lower volume compared to a conventionally designed and operated swimming pool, of for example at least 20% less volume within a 24-hour period, or at least about 30% less volume, or at least about 40% less volume, about 50% less volume, about 60% less volume, about 70% less volume, about 80% less volume, about 90% less volume, or less compared with the filtration rate required to homogeneously filter the complete volume water volume four times per day, so that a Filtration Efficiency Index of less than 80% of the Swimming Pool Filtration Index is achieved.

Also, the total number of bottom inlets from the large lagoon and water treatment system of present disclosure is defined as being less than the total number of bottom inlets required in regulations in Florida, so that a Filtration Efficiency Index of less than 80% of the Swimming Pool Filtration Index is achieved. For example, in an embodiment constructed in accordance with the invention, the total number of bottom inlets may be at least 20% less than the number of bottom inlets required in regulations in Florida, or preferably half the number of bottom inlets required in regulations in Florida, or more preferably at least 80% less than the number of bottom inlets required in regulations in Florida. For example, the total number of bottom inlets from the lagoon may be at least 20% less than the number of bottom inlets required in regulations in Florida, or at least 30% less, or at least 40% less, 50% less, 60% less, 70% less, 80% less, or 90% less than the number of bottom inlets required in regulations in Florida Pool Regulations.

Also, in embodiments constructed in accordance with the present invention, the low-cost treatment system comprises a high-frequency reduced skimmer system HFSS that allows the removal of water from the surface of the volume contained within the lagoon (including the upper layer of the water volume in contact with the skimmer), wherein such HFSS has a reduced configuration compared to a conventional swimming pool skimmer system. Generally, a conventional swimming pool skimmer system generally has to be designed and configured to withdraw the complete recirculation/filtration water flow from the pool and be able to send such flow to a filtration system. The skimmer system has to be designed and calculated to handle the total flow of water that needs to be filtered from a conventional swimming pool, which results from filtering the total volume of water at least four times per day.

On the other hand, the high-frequency reduced skimmer system (HFSS) from the low cost treatment system of present disclosure uses a reduced design, wherein the skimmers are positioned and configured to withdraw a lower water volume compared to a traditional swimming pool filtration system. For example, the HFSS may be configured to withdraw at least 20% less volume within a 24-hr period, compared with the withdrawal rate required to homogeneously filter the complete volume water volume four times per day as in Conventional Swimming Pool Centralized Filtration Systems.

The high-frequency reduced skimmer system (HFSS) may be positioned and configured to withdraw said at least 20% less volume within a 24 hr. period, such as at least 30% less, at least 40% less, at least 50% less, at least 60% less, at least 70% less, at least 80% less, or at least 90% less volume within a 24 hr. period, compared with the withdrawal rate required to homogeneously filter the complete water volume four times per day as in Conventional Swimming Pool Centralized Filtration Systems. The HFSS allows to periodically remove surface water from the lagoon to send to the low-cost reduced centralized filtration system, wherein the HFSS is configured to operate for at least 20% of the time that the lagoon is open for direct contact recreational purposes. The HFFS sends the removed water to the low-cost reduced centralized filtration system, in order to treat and/or filter such water before returning it back into the lagoon.

Embodiments constructed in accordance with the present invention also comprise a specially designed low-frequency skimmer system LFSS that removes water from the surface and/or upper part of the lagoon during planned or specific situations and with less frequency than the HFSS. The LFSS preferably operates during rain events where an increased volume of water enters the lagoon, and therefore the low-frequency skimmer system is used to provide increased renewal of the upper section through this addition of rainwater into the system, which helps to improve the effect of the low cost high-frequency reduced skimmer system. The low-frequency skimmer system is able to remove water from the lagoon during specific situations such as stormwater events, or during determined increased renewal events with the eventual additional water that has been added.

The use of the low-frequency skimmer system allows providing an additional source of water renewal from the water surface or the upper layer of the water surface, which is generally not affected or is less affected by the micro-renewal of water. In that sense, the LFSS also helps to improve the use of the low cost high-frequency reduced skimmer system, by providing an increased renewal of water through the removal of water located in the upper part of the lagoon during certain events or periods of time. The low frequency skimmer system is generally used during stormwater or rainfall events that cause the water level of the water body to rise into predetermined levels where water must be discharged. Also, the low-frequency skimmer system may also be used during high-renewal events where larger make-up water flows enter the lagoon in order to achieve a higher renewal rate, wherein the low-frequency skimmers operate by removing water from the lagoon, which allows to create an "open" cycle where make-up water is introduced into the lagoon, and the water that is found in the surface is removed from the lagoon when required.

It is important to highlight that the low frequency skimmer system is not just simple overflow from the lagoon into its surroundings, which could happen naturally during a stormwater event if water kept falling into the lagoon such that the volume of water entering the lagoon's basin surpasses the freeboard volume and no other means are used to remove it from the lagoon. Embodiments constructed in accordance with the invention require that there is a removal of water from the upper layer of the lagoon with specially designed structures that allow efficient removal of water, and therefore a simple overflow into the surroundings of the lagoon may not achieve such purpose.

As used herein, the freeboard volume is the volume of water that the lagoon could contain in addition to its design water volume. The freeboard volume may change depending on the water level and its variation during time. The present disclosure requires a minimum freeboard volume, such that the minimum freeboard distance between the water level and the top most containment lagoon of the water volume is at least 5 cm.

The use of the low-frequency skimmer system improves the effect of the high frequency reduced skimmer system, in order to remove water volume from the upper section of the lagoon, which comprises the upper surface of the water, and allows removing surface water as required.

The low-frequency skimmer system is not hydraulically connected to the low-cost reduced centralized filtration system, but instead the water extracted through the low-frequency skimmer system is removed from the lagoon and then treated in a separate system, disposed of, directed to stormwater ponds or stormwater discharge systems, among others. Such water removed through the low-frequency skimmer system is preferably disposed of, in contrast to the low-cost reduced centralized filtration system that returns the filtered water to the structure. However, such water can also be used for irrigation purposes, infiltration purposes, or other purposes, including use of such water for filtration and treatment prior to being used for recreational purposes, among others.

The low-frequency skimmer system may have a perimeter weir configuration, an overflow structure, a perimeter opening structure located in at least one portion of the perimeter of the lagoon, or a combination thereof.

Generally, the LFSS configuration is designed based on precipitation data and IDF curves (intensity, duration, frequency curves) for the specific location where the lagoon is located, and characteristics of the soil below the structure of the water body. The characteristics of the soil beneath the lagoon are determined based on a geotechnical study that determines the capacity of water infiltration and seepage into the soil. Further, it must be taken into account the runoff coefficient, the calculation of water directly falling over the water structure's surface (direct receiving of water). Other variables and methods of calculation may also be used for determining the parameters and configurations of the LFSS. With those variables, at least one storage curve (SC) is determined, which indicates the amount of water that the lagoon is able to hold and the rates of holding that water and removing such water from the lagoon. Based on experience and in the evaluation of the removal rates from the structure, the LFSS is generally designed to be able to remove a water flow the lagoon. In an embodiment constructed in accordance with the invention, the LFSS includes a weir structure on a length (L) that is wide enough to allow the removal of water at a rate that allows avoiding overfilling the lagoon with water. This means that the LFSS length should be wide enough in order to allow that the water storage curve at the lagoon never surpasses the freeboard height or the wall height. The weir length is generally determined by using the leveled method. As an example, a weir structure containing "n" openings, each one with a length of "b" and height "h2" may be used. These openings are located at a height "h1" from the average design water surface. Once the water passes through the h1 distance, the LFSS will start its operation and removes water from the lagoon. In a preferred embodiment constructed in accordance with the invention, the LFSS comprises at least one discharge weir structure, which aims at being able to remove water from the lagoon. In a further embodiment constructed in accordance with the invention, the weir structure comprises at least two openings for safety and discharge purposes. In such case, the weir structure is generally located within a perimeter wall of the lagoon so that the openings can be easily seen and cleaned, if needed.

The low-frequency skimmer system is designed to achieve a discharge of water during determined events, in order to improve the efficiency of the high-frequency reduced skimmer system, wherein a Skimmer Operation Rate is defined as the ratio of operative hours of the HFSS to the operative hours of the LFSS within a 30-day period of time.

$$\text{Skimmer Operation Rate } (SOR) = \frac{\text{Hours of Operation of } HFSS}{\text{Hours of Operation of } LFSS} \geq 10 \quad \text{(Equation 4)}$$

The Skimmer Operation Rate (SOR) then is a number that results from the division of the number of operative hours of the HFSS to the number of operating hours of the LFSS within a 30-day period, and may be calculated from the average numbers of hours that each skimmer system operates. The SOR is defined as being at least 30, wherein this means that the HFSS operates at least 10 times more time than the LFSS. For example, if within a 30-day period of time, the LFSS operated 7 hours, then the HFSS is required to operate at least 70 hours during the 30-day period of time. In the event that the number of hours of operation of the LFSS is 0 during a 30-day period of time, then it is required that the hours of operation of the HFSS is at least 180.

The LFSS design and configuration to achieve a discharge of water during determined events, including rainwater and increased renewal events, has been utilized and tested in several large structures in the United States and around the world in projects using technologies from the present patent's inventor. For these projects, the determination of the discharge water flow from the LFSS has depended on the geographic location of the lagoon, the climate variability, local regulations, and IDF curves, among others. For such structures, an Intensity value (from the IDF curves) is used for a Frequency of 100 years (generally such frequency is regulated) and with a Duration of between 1 and 6 hours (which is the approximate time of duration of a storm event). With such parameters and references, the design and configuration of a LFSS has been utilized in the following projects (among other projects):

TABLE 1

LFSS Referential Discharge Water Flows

| Country | Size of Water Body (Hectares) | Design Discharge water Flow for Frequency of 100 years (m3/h) | Storm Duration (hours) |
|---|---|---|---|
| Argentina | 3.33 | 261 | 6 |
| Dominican Republic | 2.10 | 105 | 6 |
| Mexico | 0.93 | 104 | 6 |
| Paraguay | 2.62 | 246 | 6 |
| Colombia | 3.21 | 386 | 6 |
| United States (Florida) | 3.00 | 170 | 6 |
| United States (Florida) | 2.43 | 189 | 6 |

Embodiments constructed in accordance with the present invention also may include a water micro-renewal system, which allows providing a generally permanent and more homogeneous water renewal of the water volume contained within the lagoon resulting from the micro-leakage of water passing through the inner bottom surface of the lagoon.

The water micro-renewal system comprises multiple micro-leakage points that allow generating a more homogeneous and permanent renewal of water from the lagoon. This more homogeneous renewal of water allows for a highly efficient renewal of water without creating massive dead zones that could result from the use of only a few make-up water pipes or inlets that could generate such dead areas with minimal circulation or movement. The micro-renewal system improves the low-cost reduced centralized filtration system, by having a plurality of micro-leakage points that aim to provide a more homogeneous renewal of water.

A micro-leakage point (31) refers to an area within the inner bottom surface of the lagoon where there is a hydraulic connection between the water volume contained in the lagoon and the soil or filling material under it. Preferably, micro-leakage points are situated throughout the inner bottom surface of the lagoon that is in contact with excavated soil. In another embodiment, the micro-leakage points are situated throughout the inner surface of the lagoon that is in contact with filling material.

Micro-leakage points may be created by the use of systems or materials with pores, holes, and/or spaces that aim at letting water pass through (herein referred to as micro-leakage materials or systems), and may be disposed as a plurality of points dispersed throughout the inner bottom surface of the lagoon so that the water contained within the lagoon is in contact with the soil or filling material beneath it. The micro-leakage points can be created with the use of metallic or plastic valves, discharges or outtake structures, pipes with perforations, porous materials like rocks, stones, or shotcrete, punctures, spaces produced on the joints or welding of plastic materials, spaces that are in direct contact with uncovered soil, netted or grated materials like geotextiles or fabrics, among others.

Micro-leakage materials or systems may be looped, attached, knitted, heat-sealed, induction heat-sealed, or twisted, tied, or other joining methods, as long as they create a plurality of micro-leakage points.

The micro-leakage points generate a water flow through such points, which is removed from the lagoon. In an embodiment constructed in accordance with the invention, a micro-leakage water flow is 0.05 to 0.5 liters per second per hectare of inner bottom surface of the lagoon. Embodiments in accordance with the present invention include a lagoon having a minimum micro-leakage flow, which is defined as at least 10% of the total lagoon's water volume being lost through micro-leakage annually.

It is important that the soil or filling material under the lagoon should have a permeability coefficient sufficient enough so that there is no substantial accumulation of water under the lagoon that can affect the integrity of its structure, given that such soil or filling material may continuously receive water from the micro-leakage points. The soil under the lagoon can have different types of permeability, which can be separated in:

Low permeability: Soils with a hydraulic conductivity of less than $1 \times 10^{-7}$ cm/s Medium permeability: Soils with a hydraulic conductivity of between $1 \times 10^{-3}$ to $1 \times 10^{-7}$ cm/s High permeability: Soils with a hydraulic conductivity of more than $1 \times 10^{-3}$ cm/s The soil under the lagoon and the type of solution used below the micro-leakage points are configured to allow the passage of water without generating substantial accumulation of water directly under the micro-leakage points, which may cause structural and/or aesthetic impact to the lagoon.

The micro-renewal system improves the low-cost reduced centralized filtration system, since it creates a renewal of water at a smaller scale, but evenly distributed throughout the inner bottom surface of the lagoon, facilitating thus a more homogeneous renewal. This micro-renewal system that improves the reduced low-cost centralized filtration system creates a low-cost efficient filtration system that allows purification of water at much lower capital and operational costs than traditional swimming pools systems.

The construction of an amphitheater in the surroundings of the lagoon and nearby the beach area(s) is also preferred. This creates an opportunity to hold events such as concerts and festivals, among others. Other activities include music on the beach, dining on the beach, and other events on the beach such as weddings and sports events, among many others. The surroundings of the beach may include cafes, bars, restaurants, beach centers, and similar facilities and amenities.

In the case of having a non-ticketed area within the venue, the at least one non-ticketed access area comprises optimized waterfront perimeter surrounding the swimming lagoon that has an unobstructed view of the lagoon and is not directly in front of any beach areas or esplanades that could affect the aesthetics of the landscape. The non-ticketed access area comprises cafes, bars, restaurants, beach centers, promenades, hotels, entertainment facilities, virtual and immersive experiences, and similar facilities and amenities.

A screen may also be provided in the vicinity of the swimming lagoon to broadcast content and house events and shows, and can be located in the same sector as the amphitheaters, to create a new event venue having the swimming lagoon as its backdrop. The screen may also be used for streaming live or recorded events or general media, and the stage zone can be used to broadcast or hold e-sport competitions, concerts, plays, shows, performances, among others.

Other components and methods that embody the principles of this invention can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

| 1 | Vacant or Abandoned Site |
| 2 | Tropical Style Swimming Lagoon |
| 3 | Beach Area |
| 4 | Method from the present invention |
| 5 | Sloped Access |
| 6 | Containment Wall |
| 7 | Backfill |
| 8 | Bottom Soil |
| 9 | Non permeable material |
| 10 | Support slab |
| 11 | Method |

What is claimed is:

1. An urban transformation construction method for creating a tropical-style swimming lagoon with a sloped access at vacant and/or abandoned sites, the method comprising:
    a) demolishing at least part of the vacant or abandoned site, wherein the demolition process includes excavating a layer of at least 15 cm and up to six meters;
    b) excavating material having a volume of at least 4,000 m³ from an area within the site;
    c) forming a basin for a large water body having a surface area of at least 3,000 m² and a minimum depth of at least 1.4 meters at its deepest point, wherein earthworks for the basin are created within the surrounding site perimeter, and wherein the basin includes a basin perimeter and a bottom;
    d) constructing water containment walls on at least one section of the basin perimeter to form a waterfront perimeter, wherein the shape of the waterfront perimeter is mainly curved and the basin has a maximum width of 300 meters;
    e) covering at least part of the bottom of the basin with a non-permeable material including a plastic liner, shotcrete, or flexible materials;
    f) constructing a sloped access area on at least one section of the basin perimeter to form a beach access into the large water body;
    g) providing a low-cost reduced centralized filtration system that filters a volume of water of the lagoon, wherein the low-cost reduced centralized filtration system comprises at least one of a lower total number of bottom inlets and/or a lower filtration rate to achieve a Filtration Efficiency Index (FEI) of less than 80% of the Swimming Pool Filtration Index (SPFI), wherein the Filtration Efficiency Index (FEI) and the Swimming Pool Filtration Index (SPFI) are defined as:

$$\text{Filtration Efficiency Index } (FEI) = 100 \times \frac{\#BI \times TRR}{Ws}$$

$$\text{Swimming Pool Filtration Index } (SPFI) = 100 \times \frac{\#BI_{FL} \times TRR_{FL}}{Ws}$$

$$FEI \leq 0,8 \times SPFI$$

where:
    #BI is the total number of bottom inlets found in the lagoon,
    $\#BI_{FL}$ is the total number of bottom inlets of a conventionally designed swimming pool according to Florida Swimming Pool Regulations for the same dimensions of the lagoon,
    TRR is the theoretical filtration rate which is calculated as the theoretical numeric calculation for the number of times the total volume of water is recirculated and filtered through the low-cost reduced centralized filtration system of the lagoon per day, $TRR_{FL}$ is the theoretical filtration rate from Florida Swimming Pool Regulations, Ws is the water surface of the lagoon in square feet;

h) providing a dual-frequency skimmer system, comprising:
   a high-frequency reduced skimmer system (HFSS) that periodically removes surface water from the lagoon, and the removed water being directed into a low-cost reduced centralized filtration system, wherein the high-frequency reduced skimmer system HFSS is operated for at least 20% of the time that the lagoon is open for direct contact recreational purposes;
   a low-frequency skimmer system (LFSS) that removes surface water from the lagoon during a high-renewal event or rain events, wherein the LFSS comprises at least one discharge weir structure that is located within a section of the perimeter of the lagoon;
   wherein the dual-frequency skimmer system has a Skimmer Operation Rate (SOR) of at least 10, wherein the SOR denotes a ratio of operative hours of the HFSS (41) to the operative hours of the LFSS (42) within a 30-day period of time, as seen below:

$$\text{Skimmer Operation Rate } (SOR) = \frac{\text{Hours of Operation of } HFSS}{\text{Hours of Operation of } LFSS} \geq 10$$

i) providing a micro-renewal system that operates permanently, which allows a micro-leakage of the water through a plurality of micro-leakage points located in an inner bottom surface of the lagoon, wherein:
   a total micro-leakage volume is defined as the total volume of water removed from the lagoon through the micro-leakage points and is lower than the volume of water filtered by the reduced low-cost centralized filtration system,
   the plurality of micro-leakage points are distributed throughout the inner bottom surface of the lagoon that is in contact with a soil or a filling material under the lagoon, and
   a minimum micro-leakage water flow is established, so that at least 10% of the lagoon's water volume is lost through micro-leakage annually;

j) constructing one or more barriers around the basin perimeter to cordon off an area to establish a controlled access area, wherein the controlled access area includes a beach access perimeter, and the barriers include at least one access point to selectively allow users into the controlled access area, whereby the users allowed entry into the controlled access area are able to use the beach access;

k) constructing at least one additional recreational facility comprising food and beverage and commercial facilities selected from the group comprising restaurants, bars, kiosks, stores, and cafes, wherein the at least one additional recreational facility is located in the vicinity of the waterfront perimeter.

2. The construction method of claim 1, wherein an area about the basin perimeter not located within the controlled access area forms a non-ticketed access area which may be freely accessed by users.

3. The construction method of claim 1, wherein the demolition process comprises excavation with machinery up to a depth of 20 centimeters over the design excavation level, where the final 20 cm are excavated manually.

4. The construction method of claim 1, wherein step b) comprises excavating material having a volume of at least 7,000 m³.

5. The construction method of claim 1, wherein step c) comprises forming a basin for a large water body having a surface area of at least 5,000 m2.

6. The construction method of claim 1, wherein
   when the soil type of the soil has more than a 12% material passing under a No 200 mesh (opening of 0.075 mm), the soil is compacted to achieve a 95% Modified Proctor Density, also referred to as the Maximum Dry Compacted Density
   When the soil type of the soil has less than a 12% material passing under a No 200 mesh (opening of 0.075 mm), the soil is compacted to achieve no less than 80% of its Relative Density.

7. The construction method of claim 1, further comprising placing sand in the surroundings of the beach area in order to create a sandy beach area.

8. The construction method of claim 1, the beach access having a sloped transition into the basin of between 5% and 30%.

9. The construction method of claim 1, whereby the lagoon is used for swimming, for the practice of water sports, and for housing shows and events.

10. The construction method of claim 1, wherein the sloped access area is constructed with a support slab to provide structural stability to the sloped access area.

11. The construction method of claim 1, wherein the non-permeable material that covers at least a part of the bottom of the basin is a plastic liner having at least 1 mm of thickness.

12. The construction method of claim 11, wherein the plastic liner has a white, blue or light color.

13. The construction method of claim 1, wherein the basin perimeter of the swimming lagoon includes shapes that tend to imitate natural geometries.

14. The construction method of claim 1, wherein separate access points are included, for both controlled access areas and non-ticketed access areas, so that visitors can participate in either one or both areas depending on their purpose for visiting the race or activity circuit facility and the swimming lagoon.

15. The construction method of claim 1, wherein the controlled access area is designed so that the total beach area to swimming lagoon area ratio is at least 1:2.

16. The construction method of claim 1, wherein the surroundings of the swimming lagoon include the use of amphitheaters to hold events selected from the group comprising concerts and festivals.

17. The construction method of claim 1, wherein the surroundings of the swimming lagoon include cafes, bars, restaurants, beach centers, promenades, hotels, entertainment facilities and, virtual and immersive experiences.

18. The construction method of claim 1, wherein a non-fixed screen is provided in the vicinity of the swimming lagoon to broadcast content and house events and shows.

19. The construction method of claim 1, wherein the swimming lagoon is illuminated through a lighting system.

20. The construction method of claim 1, wherein the swimming lagoon is surrounded by vegetation comprising plants and trees.

21. The construction method of claim 1, wherein the installations surrounding the tropical-style lagoon are artificially set with a beach theme, including the use of blue and white colors.

22. The construction method of claim 1, wherein the tropical style swimming lagoon has at least 50% less inlets than those required for the filtration system of a conventional swimming pool according to swimming pool standards.

* * * * *